Oct. 1, 1957  F. J. SCHWEITZER  2,807,960
LIQUID LEVEL GAUGE
Filed Nov. 29, 1955
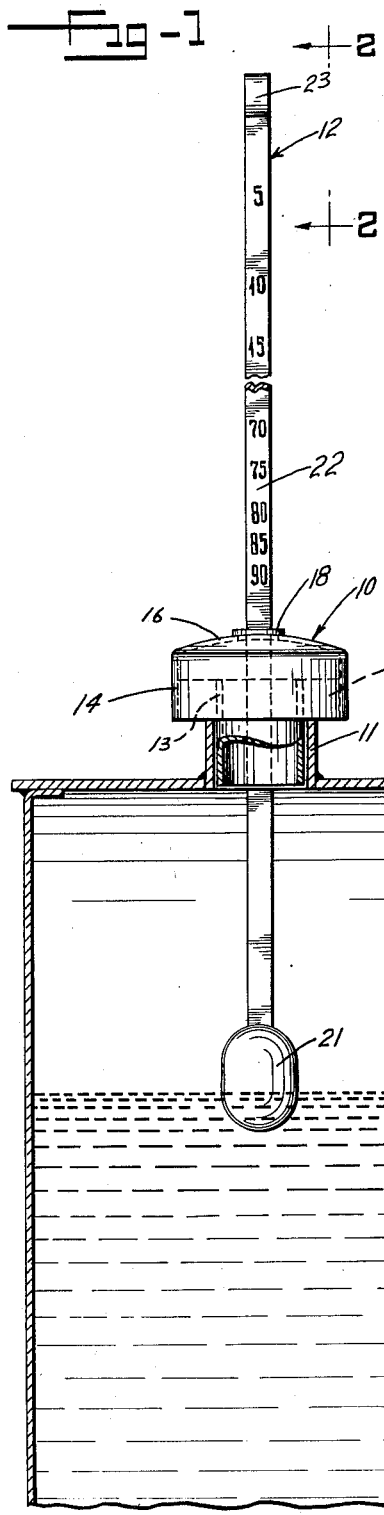
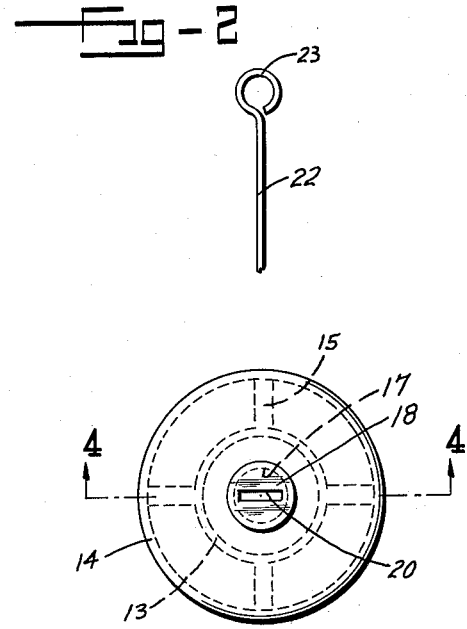
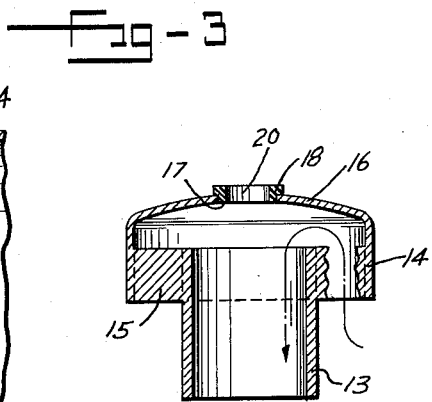
INVENTOR.
Fred J. Schweitzer
BY
Barnes, Seed & Secrest
Attorneys

United States Patent Office 2,807,960
Patented Oct. 1, 1957

2,807,960

LIQUID LEVEL GAUGE

Fred J. Schweitzer, Seattle, Wash.

Application November 29, 1955, Serial No. 549,664

1 Claim. (Cl. 73—322)

This invention relates to a gauge and, in particular, to a liquid level gauge for use in conjunction with oil drums.

In small houses, housing projects, and cabins where the expense of installing underground oil tanks is not justified and yet the heating by oil is desired, small oil tanks or drums are generally mounted on racks adjacent to the building to be heated. These tanks are filled with oil from time to time necessitating the stopping by a fuel deliverer to inspect and determine whether or not oil should be added. In those instances wherein the tanks do not need oil the stopping by the deliverer to inspect the same is a waste of time and an added expense to fuel delivery. With this shortcoming of not knowing whether or not to stop at these places having the small exposed tanks I have invented a liquid level gauge which is readily visible from a distance and which gauge makes it possible for a fuel deliverer to determine at a glance whether or not it is necessary to add oil to said tank.

Accordingly, an object of this invention is the provision of a liquid level gauge for use in conjunction with exposed stove oil drums which gauge is readily visible from a distance by a fuel deliverer.

Another object is to provide a liquid level gauge which is positive in its action.

A further object is the provision of a liquid level gauge which is of simplified construction and involves a minimum of parts.

A still further object is to provide a liquid level gauge which comprises both low cost and easy assembly and therefore is inexpensive to manufacture.

In the accompanying drawing:

Figure 1 is a specific embodiment of the liquid level gauge constructed in accordance with the preferred teachings of this invention.

Fig. 2 is a fragmentary view of the indicator rod and is taken on line 2—2 of Fig. 1.

Fig. 3 is a top plan view of the mounting cap; and

Fig. 4 is a vertical cross-sectional view taken on line 4—4 of Fig. 3 and depicts a rib broken away to illustrate gas circulation through said mounting cap.

Referring to the drawings, it is seen that the invention comprises a liquid level gauge having a cap 10 and an indicator 12 with the cap designed to fit over a filler neck 11 of an oil drum. The filler cap comprises in essence two concentric cylindrical tubes, an inner tube 13 and an outer tube 14. In this regard the external diameter of the inner tube is of a lesser dimension than the internal diameter of the filler neck so as to fit inside the same, and the outer tube is of greater diameter than the filler neck. The lower part of the outer tube and the upper part of the inner tube overlap each other and in this overlapping region these two tubes are joined by radial ribs 15, four to be exact, to make an integrated structure. As a protective cover the upper part of the outer tube curves both upwardly and inwardly to form a circumscribing cover 16 over the inner tube. However, in the apex of this cover is a circular opening 17 and which opening receives a cap 18. This cap has a rectangular aperture 20 passing therethrough and is held in the opening 17 by a press fit.

Turning now to the indicator 12, the same comprises a float 21 and an indicator rod 22. This indicator rod in a lateral cross-section view is in the configuration of a rectangle with the dimensions somewhat smaller than the dimensions of the aperture 20. On the upper portion of this rod are indicia for indicating the quantity of fuel in the tank. The extreme upper portion of this rod bends around to form a hook 23 which serves the dual function of making it easier to hold onto the indicator and also, in conjunction with the float, makes it impossible for the indicator 12 and the cap 10 to become detached as neither the float nor the hook is capable of passing through the aperture 20.

As is readily seen the manner of using the gauge includes the placing of a float inside of the fuel tank 24 and the cap 10 over the filler neck 11. The lower edge of the ribs 15 rest on the upper edge of the filler neck with the inner cylindrical tube inside of said neck and with the outer cylindrical tube 14 and the cover 16 cooperating to protect the filler neck opening so as to prevent extraneous objects falling into the oil drum. It is to be appreciated that the design of the gauge allows for the free flow of air in and out of the tank by the spacing of the inner and the outer tubes 13 and 14. As is seen, there is a positive indication of the quantity of the fuel in the tank and which indication is readily visible from a distance.

Although the materials of construction of this gauge are of secondary importance a brief word will be mentioned in this regard. The cap proper may be of cast iron or cast aluminum, or fabricated from a suitable material such as steel. And, the float may be of hollow construction and of aluminum, and the indicator rod of aluminum.

Even though the tubular members 13 and 14 are referred to as being cylindrical in cross-sectional configuration it is to be understood that these tubes may equally well be triangular quadrangular, or any other reasonable shape in cross-sectional configuration and still perform their designated function equally well. Likewise, the aperture 20 and the rod 22 may be circular in cross-section and still be within the scope of the invention.

The advantages of the invention, it is thought, will have been clearly understood from the foregoing detailed description. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim, is:

In a liquid level gauge for a liquid storage tank having an upstanding tubular filler neck, a cap having a control opening therethrough, an outer tube depending as a skirt from said cap and larger in diameter than the filler neck, an inner tube spaced downwardly from said cap in inwardly spaced concentric relation to said outer tube for telescopically fitting by part of its length into the filler neck, ribs spaced above the lower end of said inner tube and extending radially as connecting spacers between said inner and outer tubes for resting on the top of the filler neck, an indicator rod slidably received through said opening in the cap and passing through said inner tube, said rod having a stop at its upper end to limit downward travel of the rod relative to said cap, and a float carried by the tower end of the rod.

References Cited in the file of this patent

UNITED STATES PATENTS

| | | |
|---|---|---|
| 1,075,881 | Walraven et al. | Oct. 14, 1913 |
| 2,210,996 | Woods | Aug. 13, 1940 |